UNITED STATES PATENT OFFICE.

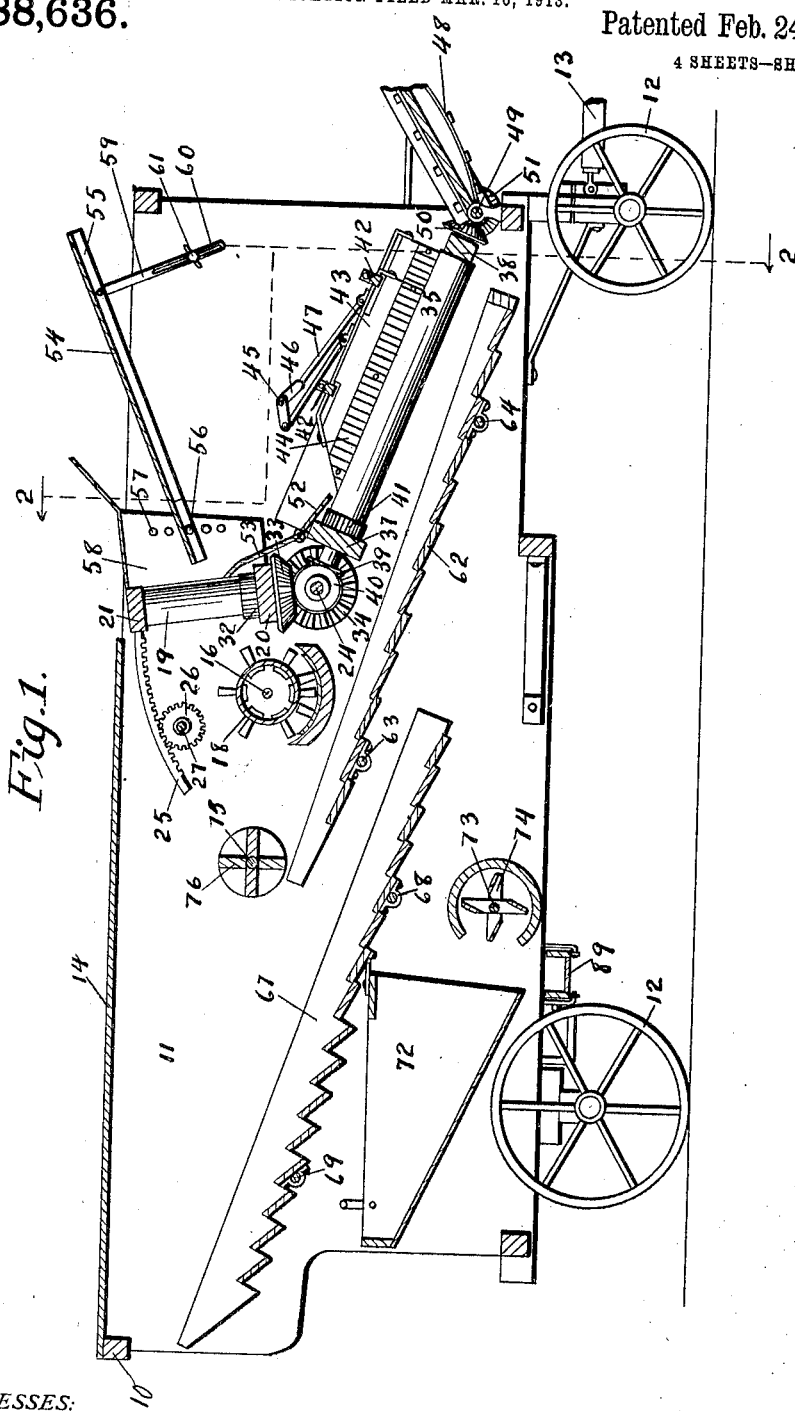

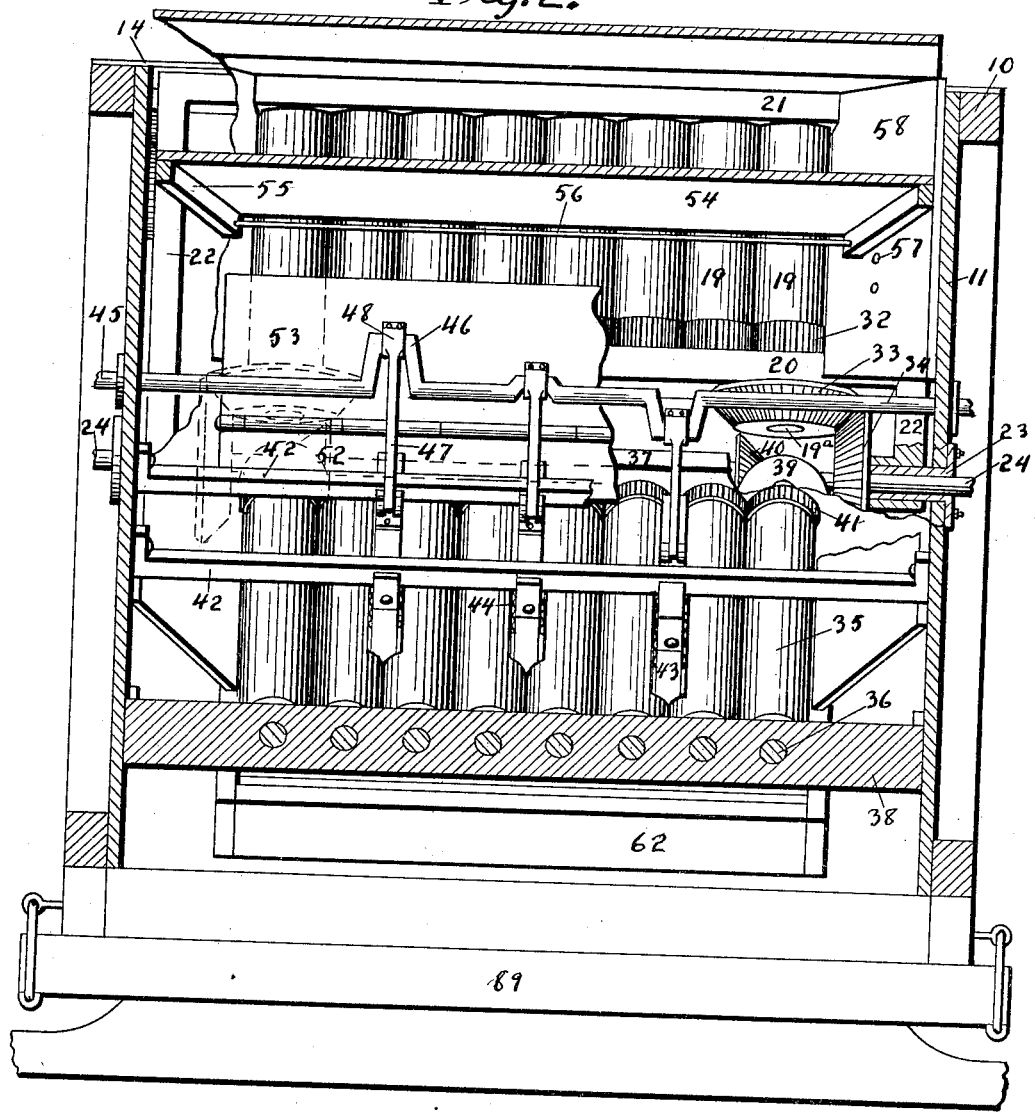

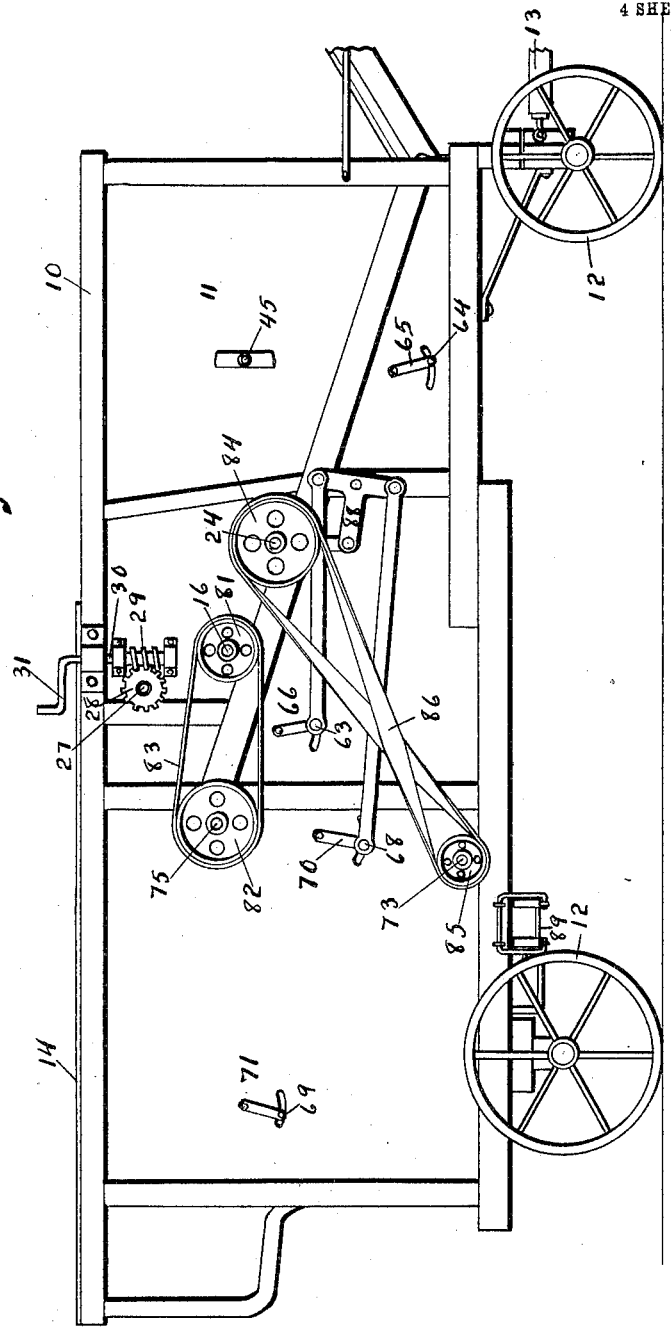

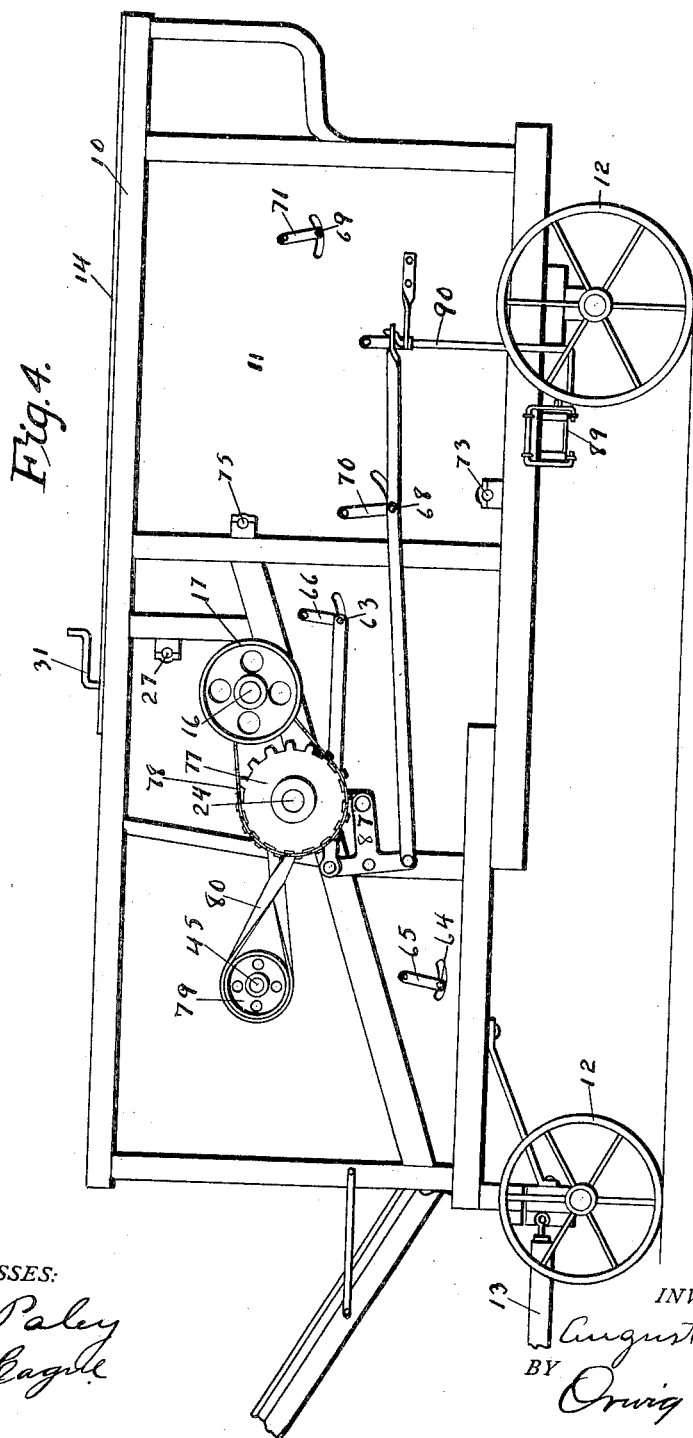

AUGUST TABBERT, OF NEWTON, IOWA.

COMBINED CORN HUSKER AND SHREDDER.

1,088,636.  Specification of Letters Patent.  Patented Feb. 24, 1914.

Application filed March 10, 1913.  Serial No. 753,429.

*To all whom it may concern:*

Be it known that I, AUGUST TABBERT, a citizen of the United States, and resident of Newton, in the county of Jasper and State of Iowa, have invented a certain new and useful Combined Corn Husker and Shredder, of which the following is a specification.

The object of my invention is to provide a combined corn husker and shredder of simple, durable and inexpensive construction, wherein a plurality of feed rolls are arranged in pairs in substantially upright position for changing the angle at which the crushed stalks are fed to the shredder's cylinder.

A further object is to provide in such a device a feed platform for the stalks of corn, so constructed and arranged that either end thereof may be tilted for feeding the stalks to the rollers at different angles and at different heights with relation to the rollers.

A further object of my invention is to provide in such a device husking rollers arranged in pairs and means for coacting therewith for removing ears of corn from the upwardly rotating sides of the adjacent members of the different pairs said means being so constructed and arranged as to roughen and partially remove the husks from the ears.

My invention consists in certain details, in the construction, combination and arrangement of the various parts of the device whereby the objects contemplated are attained, as hereinafter more fully set forth, pointed out in my claims and illustrated in the accompanying drawings, in which—

Figure 1 shows a vertical, longitudinal, sectional view through a corn shredder embodying my invention. Fig. 2 shows a detail sectional view taken on the line 2—2 of Fig. 1. Fig. 3 shows a side elevation of the right hand side of my improved corn shredder, and Fig. 4 shows a side elevation of the left hand side of the same.

In the accompanying drawings, the reference numeral 10 indicates generally the frame members of my improved corn shredder, which is preferably inclosed by side walls 11 and ordinary suitable end members. My corn shredder is preferably mounted on wheels 12 and provided with a tongue 13 for transporting it from place to place. The larger part of the rear end of my shredder is covered by a top 14. Suitably mounted in the frame is a shaft 16, on one end of which is a belt pulley 17 or other suitable means for operating the shaft 16 from any desired source of power. On the shaft, within the shredder, is an ordinary shredder cylinder 18. Just forwardly in the machine from the cylinder 18, are mounted a plurality of snapping rolls 19. The lower ends of the shafts 19ª of the snapping rolls 19 are mounted in the frame member 20, and the upper ends of said shafts are mounted in a frame member 21. The ends of the frame members 20 and 21 are connected by vertical members 22, which extend below the member 20 and are rotatably mounted upon a bearing 23 in which is mounted a transverse shaft 24. It will thus be seen that the frame in which the feed rolls 19 are mounted is pivotally movable with relation to the shaft 24.

Secured to the frame member 21 is a forwardly extending curved tooth bar 25. The teeth of the bar 25 are held in mesh with the teeth of the gear 26 on the shaft 27. On the outer end of the shaft 27 is another gear 28 in mesh with the worm gear 29 on the shaft 30, rotatably mounted on the frame of the machine and provided with a suitable crank handle 31. It will thus be seen that in the mechanism just described the upper end of the frame in which the feed rolls are mounted may be tilted forwardly and downwardly or vice versa, as desired. Upon the lower ends of the rolls 19 are provided gears 32 which are successively in mesh with each other. The shaft 19ª of one of the feed rolls 19 extends below the member 20, and mounted on the lower end of said shaft is a beveled gear 33 which is in mesh with a beveled gear 34 on the shaft 24.

Located forwardly in the machine and below the level of the lower ends of the feed rolls 19, are a plurality of husking rolls 35 mounted on the shafts 36, the upper ends of which are rotatably mounted in a frame member 37 and the lower ends of which are rotatably mounted in a frame member 38. One of the shafts 36 extends upwardly and rearwardly beyond the frame member 37. Mounted on the upper end of said last named shaft 36 is a beveled gear 39 which is in mesh with a beveled gear 40 on the shaft 24. On the husking rollers 35 are fixed gears 41 which are successively in mesh with each other. The husking rollers 35 extend from their rearward ends forwardly and downwardly in the machine. Located above the husking rollers 35 are two transverse bars or frame members 42. Slidably mounted on the bars 42 are a plurality of plates 43.

It will be seen from the above description that the husking rollers 35 are arranged in pairs with the adjacent surfaces of each pair rotating downwardly and with the adjacent surfaces of the adjacent members of the respective pairs rotating upwardly.

The lower surface or edge of each plate 43 is designed to extend downwardly beneath the upwardly moving surfaces just mentioned. The rearward edge of each plate 43 is inclined from its upper part downwardly and rearwardly in the machine, as clearly shown in Fig. 1. On each side of each of the plates 43 is a roughened or serrated face 44, the object of which will hereinafter be more fully explained. For successively drawing the plates 43 forwardly and then for moving them rearwardly the following mechanism is provided: Mounted in the frame of the machine forwardly from the shaft 24 is a transverse shaft 45 provided with a plurality of cranks 46. The planes in which the various cranks 46 rest are at acute angles to each other successively. Pivoted to each of the plates 43 is an arm 47, the forward end of which forms a suitable bearing 48 in which one of the cranks 46 is rotatably mounted.

At the forward end of the machine a traveling conveyer 48 of ordinary construction is operated from a transverse shaft 49. One of the shafts 36 extends downwardly and forwardly beyond the frame member 38 and on said end is a beveled gear 50 in mesh with a beveled gear 51 on the shaft 49.

Suitable shields 52 and 53 protect the gears 32 and 41.

My improved husker and shredder is preferably built with an adjustable feeding table 54, shown in Fig. 1. The table 54 is provided with downwardly extending flanges 55. The rearward end of the flanges 55 is provided with openings which register with each other and receive a rod or shaft 56 which is supported in holes 57 in frame members 58 which are secured to or made a part of the frame which carries the feed rolls 19. In the frame members 58 are a plurality of holes 57ª so that the rearward end of the table 54 may be elevated or lowered, as desired. Pivoted to the flanges 55, near the forward ends thereof, are downwardly extending arms 59. In each arm 59, near the lower end thereof, is a linked slot 60. A thumb screw 61 is extended through the slot 60 and secured in the frame of the machine. When the thumb screw 61 is loosened, the arms 59 can readily be tilted.

Mounted beneath the hooks or rollers 35 and the cylinder 18 is an oscillating conveyer 62 of ordinary construction, mounted upon shafts 63 and 64, which at their ends are pivoted to links 65 and 66 which are suitably pivoted on the frame of the machine. Mounted in the rear of the machine, with its forward end below the rearward end of the conveyer 62 is a second oscillating conveyer 67 which is of ordinary construction and is mounted upon shafts 68 and 69 which are pivoted to links 70 and 71, which in turn are pivoted on the frame of the machine. Mounted beneath the rearward end of the conveyer 67 is a corn receiving chute 72. Near the forward end of the corn receiving chute 72, I have mounted a shaft 73 on which is a fan 74. Rearwardly from the shaft 16 is mounted a transverse shaft 75. Near the upper end of the conveyer 62 and on the shaft 75 is a beater 76 of ordinary construction. The various shafts may be operatively connected as follows:

On one end of the shaft 24 is a sprocket wheel 77. On the shaft 16 is a sprocket, not shown, in line with the sprocket 77. A chain 78 travels upon said sprockets. On the shaft 24 is a belt pulley, not shown, and on the shaft 45 is a belt pulley 79. A belt 80 travels on the two last named pulleys. On the end of the shaft 16 opposite that on which the pulley 17 is located is a belt pulley 81. On the shaft 75 is a belt pulley 82 in line with the pulley 81. A belt 83 travels on the pulleys 81 and 82. On the shaft 24, opposite the end on which the gear 77 is located is a belt pulley 84 in line with the belt pulley 85 on the shaft 73. A crossed belt 86 travels on the pulleys 84 and 85. On the shaft 84 is a cam, not shown, through which reciprocating motion is imparted to the conveyers 62 and 67 through mechanism 87 and 88 which is of ordinary construction. Adjacent to the open end of the corn receptacle 72 is an oscillating conveyer 89 which is operated through mechanism 90, which is of ordinary construction.

In the practical operation of my improved corn shredder, the table 54 is adjusted at its rearward end by means of the shaft 56 which may be placed in any of the pairs of holes 57 and is adjusted at its forward end by means of the arm 59. The snapping rollers 19 are tilted at the desired angle by means of the bar 25 and the mechanism for moving the same hereinbefore described. The stalks of corn are placed on the table 54 and fed through the rollers 19. The crushed ends of the stalks are caught by the shredder 18 and cut into small pieces. The ears of corn are snapped off the stalks by the rollers 19 and then drop upon the rollers 35. The ears usually drop with the butts uppermost and slide downwardly on the rollers 35. The operation of said last named rollers and the plates 43 serve to strip the husks from the ears and the ears are discharged upon the conveyer 48. The shredded stalks are dropped upon the conveyer 62 and there is usually a smaller amount of shelled corn which passes through the rollers 19 with the stalks and through the rollers 35. The shelled corn and the shredded stalks are conveyed by the conveyer 62 to the lower end of the conveyer 67. The shredded stalks are then carried to the rear end of the machine and discharged. The shelled corn is dropped through double openings in the bottom of the conveyer 67 into the receptacle 72 where light particles and pieces of leaves are fanned out and the corn is discharged to the conveyer 89.

The advantages of a shredder of the kind herein described are numerous.

It will readily be understood that it is desirable to present the stalks of corn to the rollers 19 at different angles, depending upon the size of the stalks, the degree of maturity, comparative dryness, moisture and so on. By means of the arrangement of the rollers 19 and the table 54, the stalks may be fed in almost any desired position to the feed rollers. The plates 43 and the mechanism for operating the same assist in removing the husks and also in throwing the ears of corn upon the proper rollers 35. The roughened surfaces 44 assist in removing the husks from the corn.

I claim as my invention:

1. In a device of the class described, a plurality of substantially vertical snapping rollers, means for successively transmitting rotary motion from one to the other rollers, a transverse shaft, a gear thereon, a gear on one of said rollers in mesh with said first gear, said rollers being mounted in a frame having substantially upright end members pivotally mounted at their lower ends on said transverse shaft, to permit pivotal movement of said frame and the rollers therein.

2. In a device of the class described, a plurality of substantially vertical snapping rollers, means for successively transmitting rotary motion from one to the other rollers, a transverse shaft, a gear thereon, a gear on one of said rollers in mesh with said first gear, said rollers being mounted in a frame having substantially upright end members pivotally mounted at their lower ends on said transverse shaft, to permit pivotal movement of said frame and the rollers therein, and means for moving the upper end of said frame and for holding it in various positions of its adjustment.

3. In a device of the class described, a plurality of substantially vertical snapping rollers, means for successively transmitting rotary motion from one to the other rollers, a transverse shaft, a gear thereon, a gear on one of said rollers in mesh with said first gear, said rollers being mounted in a frame having substantially upright end members pivotally mounted at their lower ends on said transverse shaft, to permit pivotal movement of said frame and the rollers therein, and means for moving the upper end of said frame and for holding it in various positions of its adjustment, said means comprising a curved rack bar, a shaft, a gear thereon in mesh with said rack bar, a second gear on said last shaft, a third shaft having a worm gear formed thereon in mesh with said last described gear, and a crank on said last shaft.

4. In a device of the class described, a plurality of substantially upright snapping rolls, an adjustable feed table adjacent thereto, and means for independently securing either end of said table in various positions of its adjustment.

5. In a device of the class described, a plurality of substantially upright snapping rolls, means for tilting the upper ends thereof, an adjustable feed table adjacent thereto, and means for independently securing either end of said table in various positions of its adjustment.

Des Moines, Iowa, January 24, 1913.

AUGUST TABBERT.

Witnesses:
M. R. Hammer, Jr.,
Orpha Hammer.

Copies of this patent may be obtained for five cents each, by addressing the "Commissioner of Patents, Washington, D. C."